UNITED STATES PATENT OFFICE 2,415,839

COMPOSITE STRUCTURES

Arthur M. Neal and John J. Verbanc, Wilmington, Del., assignors to E. I. du Pont de Nemours & Company, Wilmington, Del., a corporation of Delaware No Drawing. Application March 27, 1942, Serial No. 436,536

33 Claims. (Cl. 154—40)

This invention relates to the treatment of certain textile yarns, filaments, cords, fabrics and the like, to enable such fibrous structures to be more firmly bonded to vulcanized structures such as structures composed of natural rubber, synthetic rubber, rubber substitutes and the like. More particularly, the invention relates to new and improved methods of effecting a bond between vulcanized rubber structures and reinforcing materials composed of certain materials such as regenerated cellulose, cellulose ethers, cellulose esters, cotton, linen, wool and nylon, and to the products resulting from these methods.

The recently developed use of regenerated cellulose rayon, and similar artificial fibrous or filamentous structures, as reinforcing elements in vulcanized rubber structures, such as rubber tires, has presented troublesome problems of suitably bonding the above-said reinforcing elements to the rubber. The suitable bonding of filamentous structures to rubber involves a complex combination of strength of bond for long periods of time at high and low temperatures, differences in elasticity between the reinforcing elements and the rubber, constant flexing and bending of the tires, severe shocks and impacts to be absorbed by the tires, and other unusual conditions. The bonding problem has been solved to the extent that very satisfactory tires reinforced with artificial filamentous structures have been produced. The bonding problem has not, however, been solved to the satisfaction of the tire producing art, and such active work is still being carried on to secure improved results. Many of the adhesives and bonding agents now being used, for example the latex-resorcinol-formaldehyde compositions, are applied to the artificial filamentous reinforcing elements from aqueous solutions. It has been found that aqueous solutions often impart non-uniformities of physical characteristics to the water-sensitive reinforcing elements such as regenerated cellulose structures, and reinforcing elements having non-uniform physical characteristics must be used in greater amounts than would otherwise be necessary to insure an adequate factor of safety. Recently Herndon has proposed a method disclosed in U. S. application, Serial Number 403,765, filed July 23, 1941, in which rubber is satisfactorily bonded to various supporting materials under non-aqueous conditions. However, that method is limited to the use of an "active" hydrogen-containing rubber in the process of bonding a textile supporting material to rubber.

As a result of this work on bonding of artificial filamentous reinforcing elements to rubber, the tire producing art has become cognizant of the improvements to be obtained by more securely bonding formerly used reinforcing elements, for example, cotton, to rubber in tires.

An object of this invention, therefore, is to provide a method of securing an improved bond between yarns, filaments, cords, fabrics and the like, and rubber, synthetic rubber or rubber substitutes.

A further object is to provide a method of securing an improved bond between yarns, filaments, cords, fabrics and the like, and rubber, synthetic rubber or rubber substitutes, under non-aqueous conditions.

A still further object is in the provision of a method of securing an improved bond between textile yarns, filaments, cords, fabrics, and the like of regenerated cellulose and rubber, synthetic rubber or rubber substitutes.

These and other objects will more clearly appear hereinafter.

These objects are accomplished by our invention which, briefly stated, comprises treating fibrous reinforcing structures such as yarns, filaments, cords or fabrics with a polyisocyanate, polyisothiocyanate, or a mixed isocyanate-isothiocyanate, and simultaneously or subsequently applying to the yarns, filaments, cords or fabrics rubber, synthetic rubber or rubber substitutes.

Preferably the textile material is treated with a polyisocyanate, polyisothiocyanate, or a mixed isocyanate-isothiocyanate, and simultaneously with this treatment or subsequent thereto, there is applied a solution of rubber or rubber-like material in an organic solvent followed by evaporation of the solvent. Thereafter the resulting composite structure is bonded to rubber or rubber-like material by associating the same with unvulcanized rubber or rubber-like material and vulcanizing. The treatment with the isocyanate may be made to take place concurrently with the association with the rubber, preferably by adding a polyisocyanate, a polyisothiocyanate or a mixed isocyanate-isothiocyanate to the rubber cement and treating the fabric with the resulting mixture.

The term "rubber," unless otherwise modified, as used throughout the specification and claims, is intended to be used in its usual and accepted generic sense to include rubber substitutes, natural rubber, compounded rubber, synthetic rubber, and the like, which have not been chemically modified to introduce into the molecule "active" hydrogen as measured by the Zerewitinoff method hereinafter referred to.

Throughout the description of this invention the term "plasticity" is continually employed to quantitatively describe the state of the rubber being used. The numerical index in the term refers to the thickness in thousandths of an inch obtained when a pellet 2 cc. in volume is compressed isothermally at 80° C. between the platens of a press loaded with a weight of 5000 grams for a period of three minutes. The term as used is an inverse measurement of softness; i. e., 90-plasticity rubber is not as soft as 60-plasticity rubber.

The presence of "active" hydrogen in organic compounds may be determined by the Zerewitinoff or Kohler method [Zerewitinoff Ber. 40, 2033 (1907), ibid 41, 2236 (1908); Kohler J. Am. Chem. Soc. 49, 3181 (1927)]. When tested by this method the rubber of commerce, i. e. the rubber of this invention, is essentially free of "active" hydrogen (e. g., rubber of 90-plasticity used in this inven. n when measured by the Zerewitinoff method shows a value of only 0.09 millimoles of hydrogen per gram, which value is well below the accuracy of determination).

The methods of this invention are further illustrated by the following specific examples wherein parts and proportions are by weight unless otherwise indicated.

Example I 2.5 parts of 90-plasticity rubber and 47.5 parts of dry toluene were agitated on a shaking machine until a homogeneous cement was obtained. 10 parts of 100% hexamethylene diisocyanate was then added and the resulting solution further agitated to complete the mixing operation.

Square woven (80 x 80) 275-denier, high tenacity regenerated cellulose fabric 3" x 5" was coated with the above-mentioned solution by means of a paint brush and dried in a 70° C. oven to completely remove the solvent. When dry the fabric was weighed to determine the amount adhering (in this case 23% of the initial weight of the fabric) and placed on a 3" x 6" slab of unvulcanized carcass stock calendered on to a cotton backing and vulcanized for thirty minutes at 40# steam pressure (287° F.). The slabs were cooled to room temperature and died out in 1" x 6" strips. These (2 strips) were cut from the center section of the 3" x 6" slab in order to minimize the effect of overlapping of rubber and fabric. Measurement of the effective bond strength was obtained by pulling the rayon from the rubber surface at the rate of 1"/minute using a Scott Tensile Machine. The bond strength value of the fabric to rubber in Example I was 35#/linear inch as compared with a value of 3#/linear inch for a similar untreated fabric, or an improvement of 1070% over the blank.

Example II 10 parts of 90-plasticity rubber was further plasticized by additional milling on a cold laboratory rubber mill for one hour. This rubber (which has a plasticity of approximately 60) was then added to 90 parts of dry toluene and agitated to produce a smooth uniform cement. 10 parts of 100% hexamethylene diisocyanate was then added and the agitation continued to obtain good mixing. The resulting cement was applied to the fabric in a manner similar to that described in Example I. The increase in weight of the fabric was 12%. The dried fabric was then vulcanized to rubber and tested for adhesive strength in the manner described above. The bond strength value was 30#/linear inch, or 900% improvement over the blank.

Example III 5 parts of the following compounded rubber composition was dissolved in 95 parts of dry toluene to produce a smooth, uniform cement.

|  | Parts |
|---|---|
| Rubber | 100.0 |
| Zinc oxide | 5.0 |
| Stearic acid | 1.0 |
| Sulfur | 3.0 |
| 2-mercapto-thiazoline | 1.0 |

10 parts of 100% hexamethylene diisocyanate was added and the whole shaken mechanically to obtain good mixing. This mixture was aged for a period of two weeks and was then evaluated as an adhesive in the manner described in Example I. After the application of three coats (using a paint brush), the fabric was dried and vulcanized to a rubber carcass stock. In this instance the adhesive bond between the treated "Cordura" fabric and rubber was superior to the strength of the fabric. At a pull of 70#/linear inch the fabric broke without severing the bond between the rubber and the rayon. The improvement is therefore in excess of 2235% over the untreated fabric.

Example IV 2 parts of crude pale crepe rubber (approximate plasticity 300) was dissolved in 98 parts of dry toluene to produce a smooth, uniform cement of low viscosity. 4 parts of 100% hexamethylene diisocyanate was added and the resulting cement mechanically agitated to obtain homogeneity. The "Cordura" sail cloth fabric was treated in a manner similar to that outlined in Example I. The increase in weight of the fabric was 0.5%. The dried fabric was vulcanized to rubber and tested for adhesive strength as described in Example I. The bond strength was 12#/linear inch, or an increase of 300% over similar untreated material.

Example V 10 parts of 20-plasticity rubber obtained by milling crude pale crepe on a cold rubber mill was dissolved in 90 parts of dry toluene to produce a smooth cement. 10 parts of 100% hexamethylene diisocyanate was added and the whole mixed mechanically to produce a homogeneous solution. "Cordura" sail cloth was treated with the resulting cement (as in Example I) until the cloth had increased in weight 21%. The dried fabric was vulcanized to rubber and tested for adhesive strength. A pull of 44#/linear inch was required to sever the bond between the treated fabric and vulcanized rubber, an increase of 1400% over untreated fabric.

That the development of a strong bond between the rubber and the rayon is dependent upon the combined use of hexamethylene diisocyanate in intimate contact with rubber and not upon the method used in obtaining this contact, in Examples I to V inclusive, is shown by the following examples in which modifications of the process have been used.

Example VI

To 100 parts of a 10% solution of 90-plasticity pale crepe rubber in toluene was added 10 parts of 100% hexamethylene diisocyanate. After good mechanical mixing this cement was applied to "Cordura" sail cloth in a manner outlined in Example I. Subsequent weighing of the treated fabric showed an increase in weight of 27%. Testing of the adhesive bond required a pull of 25#/linear inch to remove the fabric from the vulcanized rubber or 733% increase over the untreated fabric. This same cement was allowed to age at room temperature for a period of two months and then tested in a similar manner. Weighing of the treated fabric showed an increase in weight of 24%. A pull of 35#/linear inch was required to sever the bond. This is equivalent to an increase of 1066% over the untreated fabric.

*Example VII*

Square woven "Cordura" sail cloth was dipped in a 10–20% hexamethylene diisocyanate solution and after being in contact with the solution for a period of one minute the wet sample was removed and placed in a dry closed container and allowed to remain in this moist condition for twenty-four hours, after which the cloth was dried and several coats of a vulcanizable cement applied, drying to remove the solvent between each application. When dry the treated fabric was vulcanized to rubber. A pull of 21#/linear inch was required to sever the adhesive bond, an improvement of 600% over similar untreated material.

*Example VIII*

Square woven "Cordura" sail cloth was immersed in a 20% solution of hexamethylene diisocyanate in toluene for fifteen minutes.

The cloth was removed and painted immediately with several coats of a 10% cement composed of 45-plasticity rubber in toluene, drying after each application to remove the solvent. After final drying the treated fabric was placed on a slab of unvulcanized carcass stock and cured for thirty minutes at 40# steam pressure (287° F.). A pull of 16#/linear inch was required to sever the bond between the treated fabric and the vulcanized rubber. This is an increase of 430% over a similar untreated fabric.

*Example IX*

Square woven fabric prepared from 275-denier, high tenacity regenerated cellulose was immersed in 20% hexamethylene diisocyanate for a period of fifteen minutes. Upon removal of the treated fabric from the bath, several coats of a vulcanizable rubber cement were applied. The fabric was dried before each additional application. After final drying the treated fabric was heated at 40# steam pressure (287° F.) for a period of thirty minutes. The fabric was cooled to room temperature (25° C.) and again painted with several coats of a vulcanizable rubber cement. After final drying, the strip of treated fabric was placed on a slab of unvulcanized rubber carcass stock and cured for thirty minutes at 287° F. After cooling to 25° C., the strip was tested for adhesion. A pull of 33#/linear inch was required to sever the bond between rubber and fabric. This is an improvement of 1000% over a similar untreated fabric.

*Example X*

A sample of square woven "Cordura" sail cloth 3" x 5" was dipped in a 15% toluene solution of hexamethylene diisocyanate, removed and painted immediately with a 10% pale crepe rubber cement (rubber plasticized 46–P using commercial "RPA" No. 4). Several coats of this material were applied, drying to remove the solvent before each application. The resulting treated fabric was vulcanized to a rubber carcass stock. A pull of 16#/linear inch was required to remove the treated fabric from the vulcanized rubber, or an improvement of 430% over the untreated blank.

Although the process of the invention is particularly adaptable to bonding rayon to rubber, it may also be utilized for increasing the bond between rubber and other textile fabrics as shown by the following examples.

*Example XI*

A square woven cotton reinforcing fabric was coated with a sufficient quantity of the cement of Example II to increase the weight 31%. The treated fabric was then vulcanized to rubber. A bond strength value of 33#/linear inch was obtained, which is an increase of 83% over the untreated fabric.

*Example XII*

A 3" x 5" strip of square woven "Cordura" sail cloth which had previously been treated with an organic compound similar to those disclosed in U. S. Patent No. 2,146,392 to increase its water repellency was dipped in 10–15% hexamethylene diisocyanate for a period of one and one-half hours. The wet sample was painted with several coats of vulcanizable rubber cement, drying to remove the solvent before each application. After final drying, the treated fabric was placed on a 3" x 6" slab of unvulcanized rubber carcass stock and cured for thirty minutes at 287° F. After cooling to room temperature (25° C.), the slabs were died out and tested in the manner previously described in Example I. A pull of 38#/linear inch was required to remove the fabric from the rubber, which corresponds to an improvement of 375%.

*Example XIII*

A sample of nylon fabric 3" x 5" was painted with several coats of a 10% hexamethylene diisocyanate solution, drying to remove the solvent before each application. After several applications had been applied the treated fabric was coated with a 10% vulcanizable rubber cement in a similar manner. After final drying, the fabric was placed on a 3" x 6" slab of unvulcanized rubber carcass stock and cured for thirty minutes at 287° F. The sample was tested for adhesion in the normal manner. A pull of 55#/linear inch could not remove the treated fabric from the rubber. This is an improvement in excess of 2500% over the untreated fabric.

The use of our invention with synthetic rubber is illustrated by the following examples:

*Example XIV*

A square woven cotton reinforcing fabric was coated with a sufficient quantity of the cement of Example II to increase the weight 21%. The treated fabric was then vulcanized to neoprene synthetic rubber. A bond strength value of 35#/linear inch was obtained, which is an increase of 75% over the untreated fabric. A weight increase of 28% gave a bond strength value of 37#/linear inch or 85% improvement over the original fabric.

*Example XV*

Square woven "Cordura" sail cloth of Example I was coated with a sufficient quantity of the cement described in Example II to increase the weight 8%. The resulting fabric was vulcanized to neoprene synthetic rubber. A bond strength value of 17#/linear inch was obtained, which is an increase of 240% over the untreated material. Application of 12% of the cement gave a bond strength of 22#/linear inch, which is equivalent to 340% improvement over the untreated fabric.

Although the examples already cited all employ hexamethylene diisocyanate as the polyfunctional agent, other polyfunctional compounds as hereinafter defined may also be used. A few representative alternate compounds have been employed in the following examples:

Example XVI 100 parts of a 10% solution of 90-plasticity rubber in toluene was well mixed by mechanical agitation with 100 parts of a 10% solution of meta-phenylene diisocyanate, also in toluene.

Square woven "Cordura" sail cloth was coated with the resulting cement as described in Example I. After final drying, the treated cloth was vulcanized to rubber and tested for bond strength in the manner described above in Example I. The increase in weight of the fabric was 30%, and the bond strength was 18#/linear inch which is equivalent to an improvement of 500% over the untreated fabric.

Example XVII

To a cement composed of 10 parts of 45-plasticity rubber and 90 parts of dry toluene was added 10 parts of para,para'-biphenylene diisocyanate. The resulting mixture was agitated mechanically to insure good mixing. This cement was applied to "Cordura" as previously described in Example I. The increase in weight was 95%. The dried fabric was vulcanized to rubber and treated as previously described. A pull of 30#/linear inch was required to sever the adhesive bond between the treated fabric and vulcanized rubber. This corresponds to an improvement of 900%.

Example XVIII

To a cement composed of 10 parts of 75-plasticity rubber and 90 parts of dry benzene was added 10 parts of 4,4'-diphenylmethane diisocyanate. The resulting mixture was agitated mechanically to insure good mixing. This cement was applied to "Cordura" as previously described in Example I. The increase in weight was 11%. The dried fabric was vulcanized to rubber and treated as previously described. A pull of 34#/linear inch was required to sever the adhesive bond between the treated fabric and vulcanized rubber. This corresponds to an improvement of 1030%.

The examples above illustrate the use of rubber in solution. The following examples illustrate other methods of applying the rubber.

Example XIX

Square woven (80 x 80) 275-denier, high tenacity regenerated cellulose fabric 3" x 5" was aged for a period of fourteen days at room temperature (25° C.) in a 10% solution of hexamethylene diisocyanate. At the end of this period the fabric was removed and dried to remove the solvent. The dried fabric was then placed on a 3" x 6" slab of carcass stock calendered to a cotton backing and vulcanized at 40# steam pressure (287° F.) for thirty minutes. The slabs were cooled, died out into 1" x 6" strips and tested as in Example I. The pull required to sever the bond was 12#/linear inch or 300% improvement over similar untreated material.

Example XX

A sample of square woven "Cordura" sail cloth was placed in a closed container and treated with a 10% toluene solution of hexamethylene diisocyanate for a period of three hours. The fabric was removed and dried at room temperature (25° C.) When all of the solvent had evaporated, the fabric was treated on a calendering machine with a vulcanizable friction stock composed of the following ingredients:

| | Parts |
|---|---|
| Pale crepe | 100.0 |
| Zinc oxide | 5.0 |
| Sulfur | 2.5 |
| Stearic acid | 1.0 |
| "Zenite" | 0.75 |

The fabric which was frictioned on one side increased in weight 16%. The treated fabric was then vulcanized to rubber and tested in the manner described in Example I. A pull of 13#/linear inch was required to sever the bond between the treated fabric and the vulcanized rubber, or an improvement of 335% over similar untreated material.

Example XXI

A 3" x 5" strip of square woven "Cordura" sail cloth was dipped in 10–15% hexamethylene diisocyanate solution for a period of 25–30 minutes. The sample was removed and placed (without drying) on a 3" x 6" slab of unvulcanized neoprene carcass stock and cured 30–40 minutes in a laboratory press. The adhesion test carried out on the vulcanized slab required a pull of 45# to remove the fabric from the neoprene, an improvement of 800% over the untreated fabric.

The following examples further illustrate that other materials besides natural rubber will likewise fulfill the requirements of our invention.

Example XXII

Vulcanized rubber prepared by heating 100 parts of rubber and 10 parts of sulfur for 120 minutes at 60# steam pressure (293° F.) was shredded on a rubber mill and extracted with acetone in a Soxhlet extractor to remove unreacted sulfur.

The resulting product was peptized by heating in a solution composed of toluene and piperidine. The resulting peptized rubber was precipitated by addition of denatured ethyl alcohol and the rubber mass well washed with the denatured alcohol to remove all possible traces of piperidine. The rubbery mass was then dissolved in toluene to produce a 10% cement.

To 100 parts of the above mentioned cement was added 10 parts of hexamethylene diisocyanate. The resulting solution was mixed mechanically to produce a uniform cement.

Square woven "Cordura" sail cloth 3" x 5" manufactured from 275-denier, high tenacity regenerated cellulose yarn was coated with a sufficient quantity of the above mentioned cement to increase the weight 8%. The treated fabric was then vulcanized to rubber. A bond strength value of 20#/linear inch was obtained which is an increase of 400% over the untreated blank. Deposition of 12% of the same cement gave 775% improvement over the untreated fabric.

Example XXIII

A square woven cotton reinforcing fabric was coated with a sufficient quantity of the cement mentioned in Example VI to increase the weight of the fabric 22%. The treated fabric was then vulcanized to rubber. A bond strength of 35#/linear inch was obtained, which is an increase of 95% over similar untreated fabric. Application of 31% of the cement increased the bond strength to 40#/linear inch or an increase of 125% over the standard.

Example XXIV

"Cordura" sail cloth 3" x 5" was treated with the same cement as described in Example VI until the dried fabric was 4.6% heavier. The fabric was then vulcanized to neoprene synthetic rubber. A pull of 30#/linear inch was required to sever the bond between the treated fabric and the vulcanized neoprene. This is equivalent to a 500% improvement in bond strength over the untreated fabric. Application of 8.6% of the cement gave a bond strength of 33#/linear inch or a 560% improvement over the blank.

Example XXV

A square woven cotton reinforcing fabric was coated with a sufficient quantity of the cement in Example VI to increase the weight of the fabric 6.5%. The treated fabric was then vulcanized to neoprene synthetic rubber. A bond strength of 25#/linear inch was obtained, which is an increase of 25% over similar untreated material. Deposition of enough cement to increase the weight of the fabric 22% increased the bond strength to 40#/linear inch or 100% improvement over the standard.

Example XXVI 60 parts of neoprene synthetic rubber was placed on a rubber mill and broken down to form a smooth sheet. 0.25 part of diethyl ammonium diethyl dithiocarbamate was added and the resulting mixture milled for an additional thirty minutes. The resulting softened neoprene was dissolved in 240 parts of benzene to produce a smooth 20% cement.

Square woven "Cordura" sail cloth was treated by immersing in a 20% solution of hexamethylene diisocyanate for a period of 10–15 minutes. The cloth was removed and painted immediately with several coats of the above mentioned neoprene cement, drying at 70° C. after each application. After final drying, the treated fabric was placed on a slab of rubber carcass stock and vulcanized thirty minutes at 287° F. The bond strength value was 35#/linear inch, an improvement of 1070%.

Example XXVII 10 parts of 100% hexamethylene diisocyanate was added to a cement composed of 10 parts of plasticized neoprene and 90 parts of dry toluene and shaken mechanically to obtain a uniform cement. The resulting cement was applied to nylon fabric as previously described in Example I. The dried fabric was vulcanized to rubber and tested as previously described. A pull of 53#/linear inch was not sufficient to remove the fabric from the rubber. This is an improvement in excess of 2500% over the untreated blank.

Example XXVIII

Linen fabric (3" x 5") was treated with several coats of the neoprene cement of Example XXVII. After final drying the strip of treated fabric was placed on a slab of unvulcanized rubber carcass stock and vulcanized in a press for thirty minutes at 287° F. When cool (25° C.) the slabs were died out in 1" x 6" strips and tested for adhesion in the manner described in Example I. A pull of 55#/linear inch was not sufficient to remove the fabric from the vulcanized rubber. A strip of untreated linen vulcanized in a similar manner required a pull of 13#/linear inch to sever the bond between the fabric and the rubber.

Example XXIX 10 parts of neoprene was plasticized by milling on a cold rubber mill for a period of twenty minutes. The resulting softened mass was dissolved in 90 parts of dry toluene. 10 parts of 100% hexamethylene diisocyanate was added to the smooth cement. After mixing mechanically to obtain a homogeneous solution, the material was applied to square woven "Cordura" sail cloth as described in Example I. After final drying the treated fabric was placed on a sheet of unvulcanized neoprene carcass stock and cured for thirty minutes at 287° F. A pull of 50#/linear inch was required to separate the treated fabric from the cured neoprene, which is equivalent to an improvement of 900% over the untreated fabric.

Example XXX

A sample of nylon fabric 3" x 5" was painted with several coats of a 10% neoprene cement containing hexamethylene diisocyanate, drying between applications to remove the solvent. After final drying the treated fabric was placed on a 3" x 6" slab of unvulcanized neoprene carcass stock and cured for thirty minutes at 40# steam pressure. After cooling to 25° C. the slabs were tested for adhesion in the usual manner. A pull of 42#/linear inch was required to sever the bond between the treated fabric and the rubber. This is an improvement of 750% over the untreated fabric.

The following two examples describe the use of other rubber-like materials in carrying out our invention.

Example XXXI

"Cordura" sail cloth was dipped in a 10–20% solution of hexamethylene diisocyanate for several minutes followed by drying to remove the solvent. Several coats of a 5% cement composed of balata rubber in toluene were applied as explained in Example I. The fabric was dried to remove the solvent and vulcanized to rubber. A pull of 10#/linear inch was required to remove the treated fabric from the rubber, an increase of 235% over similar untreated fabric.

Example XXXII 5 parts of balata rubber were dissolved in 95 parts of dry toluene to produce a smooth, uniform cement. To this cement was added 5 parts of 100% hexamethylene diisocyanate, and the resulting solution well shaken to obtain good mixing. Square woven "Cordura" sail cloth was treated with the above cement as described in Example I. The dried fabric was vulcanized to rubber for thirty minutes at 287° F. The adhesion test was identical with that described in Example I. A pull of 20#/linear inch was required to sever the adhesive bond between the treated fabric and vulcanized rubber. This is equivalent to an increase of 570% over a similar untreated fabric.

It is to be understood, of course, that our invention is not limited to the exact ingredients, conditions and procedures described above by way of illustration, but is susceptible rather to wide variation and substitution. Thus, the cord, fabric or other structure used in this invention may be composed of regenerated cellulose produced by the viscose process, or regenerated cellulose produced by the cuprammonium process, or cellulose esters and ethers, including cellulose acetate, or purely synthetic fibers such as nylon. The cord or other structures may be composed of a plurality of filaments, or it may be composed of a single large filament. Cords, fabric, etc., made from cotton may also be successfully bonded to rubber by the present invention. Cords and fabric made from materials other than cellulose, such as wool, may also be used. Synthetic linear polyamides such as disclosed in U. S. Patent No. 2,071,250 to Carothers are also suitable for use in accordance with the present invention.

Any polyisocyanate, polyisothiocyanate, or mixed isocyanate-isothiocyanate of the general formula OCN—R—NCS, in which R is a divalent organic radical will function for the purposes of our invention.

As examples of polyisocyanates, polyisothiocyanates, and mixed isocyanate-isothiocyanate compounds, the following may be named: Hexamethylene diisocyanate, paraphenylene diisocyanate, 2,3-dimethyl-tetramethylene diisocyanate, decamethylene diisocyanate, hexamethylene diisothiocyanate, para, para'-diphenylene diisocyanate, 2-chlorotrimethylene diisocyanate, 5-nitro-1,3-phenylene diisocyanate, ethylene diisocyanate, dodecamethylene diisocyanate, butane-1,2,2-triisocyanate, ethylene diisothiocyanate, meta-phenylene diisocyanate, para-phenylene diisothiocyanate, hexamethylene-1-isocyanate-4-isothiocyanate, benzene-1,2,4-triisothiocyanate, polymethylene diisocyanates and diisothiocyanates such as trimethylene diisocyanate, tetramethylene diisocyanate, pentamethylene diisocyanate, etc., the corresponding isothiocyanates; alkylene diisocyanates and diisothiocyanates such as propylene-1,2-diisocyanate, butylene-1,2-diisocyanate, butylene-1,3-diisocyanate, butylene-2,3-diisocyanate, and butylene-1,3-diisothiocyanate; alkylidene diisocyanates and diisothiocyanates such as ethylidene diisocyanate (CH₃CH(NCO)₂), butylidene diisocyanate (CH₃—CH₂—CH₂—CH(NCO)₂)

cyclo-alkylene diisocyanates and diisothiocyanates such as cyclo-hexylene-1,2-diisocyanate; aromatic diisocyanates and diisothiocyanates, 1-methyl-phenylene-2,4-diisocyanate, naphthylene-1,4-diisocyanate; aliphatic aromatic diisocyanates or diisothiocyanates such as xylylene diisocyanate, 4,4'-diphenyl methane diisocyanate, xylylene diisothiocyanate, and diisocyanates and diisothiocyanates containing hetero atoms such as

SCNCH₂—O—CH₂NCS

SCNCH₂CH₂—O—CH₂CH₂NCS and

SCN(CH₂)₃—S—(CH₂)₃NCS

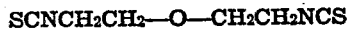
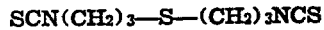

Any material falling under the term "rubber" as defined hereinabove, such as natural rubber, for example, smoked sheets, pale crepe, gutta percha, and balata, and various synthetic rubber-like materials produced from such materials as the polymers of isoprene, butadiene, chloroprene, and their homologs, and elastomers made by the copolymerizing or interpolymerization of these materials with other polymerizable materials may be employed in our invention.

Although toluene has been specified in the above examples as the solvent for the rubber and the cyanate compound, any liquid which is nonreactive with the cyanate compound and which is a solvent for either the rubber or the cyanate compound will be suitable. Common solvents for both the rubber and the cyanate compound may also be used.

As has been pointed out in the examples, it is possible to apply the rubber phase to the rayon in the absence of solvents. However, it is preferable to use the rubber in solution; the concentration of the cement may be varied from 1% to 50%, depending upon the plasticity of the rubber used and the particular solvent employed. The preferred range is from 1% to 20%.

Certain of the polyisocyanates and polyisothiocyanates, as for example hexamethylene diisocyanate, are liquids. In such cases these materials may be used either in solution (in an inert solvent) or as pure materials. In general, it is preferable to use these materials in solution ranging in concentration from 0.5% to 95%, the preferred concentration range being 1% to 30%.

The amount of material associated with the cellulosic material of the fabric will depend upon the concentration of the treating bath and the number of treatments given the fabric. In order to obtain optimum results, it has been found desirable to apply sufficient of the mixture of rubber and polyisocyanate, polyisothiocyanate or mixed isocyanate-isothiocyanates to noticeably increase the weight of the yarn. Although the quantity of rubber and the above mentioned isocyanate material applied to the yarn will vary depending upon the article to be manufactured and the strength of the bond desired, satisfactory results may be obtained when the increased weight, which measures the quantity applied, is from 0.25% to 95%.

The yarns, cords, or fabrics may be treated in any suitable manner as by immersing in a suitable solvent solution of the ingredients, regulating the amount of material adhering to the cellulose by means of squeeze rolls, scrapers, or other suitable devices, or by merely allowing the excess to drain off followed by solvent evaporation either spontaneously or at elevated temperatures.

The method or order of treatment should in no way be considered as limiting the application of this invention. For example, it may be preferable to apply the rubber and polyisocyanate or polyisothiocyanate to the yarn, cord or fabric separately. The structure may first be treated with a polyfunctional isocyanate dissolved in a solvent, for example, toluene, benzene, solvent naphtha, gasoline, carbon tetrachloride, etc., dried to remove excess solvent and finally treated with a rubber cement of the desired kind. The fabric may also be treated with a solvent solution of the desired rubber, dried to remove the solvent, and then the said cyanate compound applied thereto from the solution or in vapor or gaseous form.

If regenerated cellulose tire cord or fabric, treated with one of the above-said cyanate compounds and rubber cement in the manner described, is placed upon a commercial compounded rubber stock, such as is customarily used in the manufacture of tires, and the whole is cured at high pressure and elevated temperature to vulcanize the rubber stock completely, the treated rayon is found to be strongly bonded to the rubber. If the treated rayon cord is subjected to a standard pull-out test at an elevated temperature, for example, at 270° F., to measure the bond between the cord and rubber at this temperature, the bond is found to be at least equal to and often better than the bond of cotton cord to rubber at this temperature, a fact which is of the utmost importance in the construction of tires, fan belts, and similar articles, which develop a high temperature under ordinary conditions of usage. Many of the previously known adhesives fail to provide a satisfactory bond at temperatures in this range.

In addition to improving the bond of regenerated cellulose to rubber, the present invention greatly increases the durability to flexing and bending of a pad consisting of plies of cords treated in accordance with this invention to which a skim coat of compounded rubber stock has been applied and the whole subjected to sufficient pressure and temperature to completely vulcanize the rubber. The pad may be flexed and bent under tension many times before separation of the plies takes place. For example, where such a pad prepared from untreated regenerated cellulose cord may be flexed 2,000 times and a similar pad prepared from untreated cotton may be flexed 17,000 times before separation of the plies takes place, a similar pad prepared from regenerated cellulose cord treated in accordance with this invention may be flexed 23,000 times before separation of the plies takes place.

Moreover, regenerated cellulose cords treated according to this invention and combined with rubber show good resistance to known fatigue tests.

Fatigue resistance of tire cord may be measured in a variety of ways; for example, the cord may be subjected for a fixed number of flexings to drastic conditions of flexing and simultaneous stretching at an elevated temperature, conditions which are designed to approximate those encountered during the actual use of tires. The tensile strength of the cord after the prescribed flexing or bending and stretching, compared with the tensile strength before the test, gives one measure of the fatigue resistance of the cord. For regenerated cellulose cord, treated according to this invention, the drop in tensile strength after such a fatigue resistance test is very slight, whereas the loss of tensile strength of cotton cord under the same conditions is very substantial. Obviously, this improved resistance to fatigue exhibited by regenerated cellulose cord treated according to this invention is a great advantage in cord designed for use in tires, fan belts, and the like, which undergo constant and severe flexing, bending and stretching when in operation.

In addition to the foregoing advantages, the treatment of regenerated cellulose cord or fabric according to the present invention does not excessively discolor, stiffen or harden the cord or fabric. The cords or fabrics treated by this method are relatively non-tacky and exhibit no peeling or cracking as is often the case with adhesives known to the art at the present time. The process of treating cellulosic materials as outlined in the examples, contrary to the processes of the prior art, is performed in the absence of water. Water is known to be deleterious to regenerated cellulose cord and fabric, since it causes a pronounced swelling and weakening of this material. This adhesive also possesses several additional advantages. These are: (1) ease of application; (2) simplicity of equipment, making unnecessary any pronounced changes in equipment in current commercial processes for the treatment of fabrics or individual cords; and (3) the cheapness and availability of these raw materials.

We claim:

1. In the process of manufacturing reinforced rubber articles, the improvement which comprises applying to a fibrous reinforcing structure an organic cyanate from the group consisting of polyisocyanates, polyisothiocyanates and mixed isocyanate-isothiocyanate compounds, and a rubber.

2. In the process of manufacturing rubber articles reinforced with a fibrous material of regenerated cellulose, the improvement which comprises applying to a fibrous reinforcing structure comprising regenerated cellulose, an organic cyanate from the group consisting of polyisocyanates, polyisothiocyanates, and mixed isocyanate-isothiocyanate compounds, and a rubber.

3. In the process of manufacturing reinforced rubber articles, the improvement which comprises applying to a fibrous reinforcing structure an organic cyanate from the group consisting of polyisocyanates, polyisothiocyanates and mixed isocyanate-isothiocyanate compounds, and a plasticized rubber.

4. In the process of manufacturing reinforced rubber articles, the improvement which comprises applying to a fibrous reinforcing structure an organic cyanate from the group consisting of polyisocyanates, polyisothiocyanates, and mixed isocyanate-isothiocyanate compounds, and a solution of a rubber, and evaporating the solvent from the resulting composite structure.

5. In the process of manufacturing rubber articles reinforced with a fibrous material of regenerated cellulose, the improvement which comprises applying to a fibrous reinforcing structure comprising regenerated cellulose, an organic cyanate from the group consisting of polyisocyanates, polyisothiocyanates and mixed isocyanate-isothiocyanate compounds, and a solution of a rubber, and evaporating the solvent from the resulting composite structure.

6. In the process of manufacturing reinforced rubber articles, the improvement which comprises applying to a fibrous reinforcing structure an organic cyanate from the group consisting of polyisocyanates, polyisothiocyanates and mixed isocyanate-isothiocyanate compounds, and a solution of natural rubber, and evaporating the solvent from the resulting composite structure.

7. In the process of manufacturing rubber articles reinforced with a fibrous material of regenerated cellulose, the improvement which comprises applying to a fibrous reinforcing structure comprising regenerated cellulose, an organic cyanate from the group consisting of polyisocyanates, polyisothiocyanates and mixed isocyanate-isothiocyanate compounds, and a solution of natural rubber, and evaporating the solvent from the resulting composite structure.

8. The process of manufacturing reinforced rubber articles which comprises applying to a fibrous reinforcing material an organic cyanate from the group consisting of polyisocyanates, polyisothiocyanates and mixed isocyanate-isothiocyanate compounds, and a rubber, associating the resulting structure with a vulcanizable rubber, and subjecting the resulting mass to a vulcanizing temperature.

9. The process of manufacturing rubber articles reinforced with a fibrous material of regenerated cellulose which comprises applying to a fibrous reinforcing structure comprising regenerated cellulose, an organic cyanate from the group consisting of polyisocyanates, polyisothiocyanates and mixed isocyanate-isothiocyanate compounds, and a rubber, associating the resulting structure with a vulcanizable rubber, and subjecting the resulting mass to a vulcanizing temperature.

10. The process of manufacturing reinforced rubber articles which comprises applying to a fibrous reinforcing material an organic cyanate from the group consisting of polyisocyanates, polyisothiocyanates and mixed isocyanate-isothiocyanate compounds, and a plasticized rubber, associating the resulting structure with a vulcanizable rubber, and subjecting the resulting mass to a vulcanizing temperature.

11. The process of manufacturing rubber articles reinforced with a fibrous material of regenerated cellulose which comprises applying to a fibrous reinforcing structure comprising regenerated cellulose, an organic cyanate from the group consisting of polyisocyanates, polyisothiocyanates and mixed isocyanate-isothiocyanate compounds, and a plasticized rubber, associating the resulting structure with a vulcanizable rubber, and subjecting the resulting mass to a vulcanizing temperature.

12. The process of manufacturing rubber articles reinforced with a fibrous material of regenerated cellulose which comprises applying to a fibrous reinforcing structure comprising regenerated cellulose, an organic cyanate from the group consisting of polyisocyanates, polyisothiocyanates and mixed isocyanate-isothiocyanate compounds, and a natural rubber, associating the resulting structure with a vulcanizable rubber, and subjecting the resulting mass to a vulcanizing temperature.

13. The process of manufacturing reinforced rubber articles which comprises applying to a fibrous reinforcing structure an organic cyanate from the group consisting of polyisocyanates, polyisothiocyanates and mixed isocyanate-isothiocyanate compounds, and a solution of a rubber, evaporating the solvent from the resulting composite structure, associating said composite structure with a vulcanizable rubber, and subjecting the resulting mass to a vulcanizing temperature.

14. The process of manufacturing rubber articles reinforced with a fibrous material of regenerated cellulose which comprises applying to a fibrous reinforcing structure comprising regenerated cellulose, an organic cyanate from the group consisting of polyisocyanates, polyisothiocyanates and mixed isocyanate-isothiocyanate compounds, and a solution of a rubber, evaporating the solvent from the resulting composite structure, associating said composite structure with a vulcanizable rubber, and subjecting the resulting mass to a vulcanizing temperature.

15. The process of manufacturing reinforced rubber articles which comprises applying to a fibrous reinforcing structure an organic cyanate from the group consisting of polyisocyanates, polyisothiocyanates and mixed isocyanate-isothiocyanate compounds, and a solution of a natural rubber, evaporating the solvent from the resulting composite structure, associating said composite structure with a vulcanizable rubber, and subjecting the resulting mass to a vulcanizing temperature.

16. The process of manufacturing rubber articles reinforced with regenerated cellulose reinforcing structure which comprises applying to a regenerated cellulose reinforcing structure an organic cyanate from the group consisting of polyisocyanates, polyisothiocyanates and mixed isocyanate-isothiocyanate compounds, and a rubber solution containing from about 1% to about 20% by weight of a natural rubber, evaporating the solvent from the resulting composite structure, associating said composite structure with a vulcanizable rubber, and subjecting the resulting mass to a vulcanizing temperature.

17. The process of manufacturing reinforced rubber articles which comprises applying to a fibrous reinforcing structure an organic diisocyanate and a solution of a rubber, evaporating the solvent from the resulting composite structure, associating said composite structure with a vulcanizable rubber, and subjecting the resulting mass to a vulcanizing temperature.

18. The process of manufacturing reinforced rubber articles which comprises applying to a fibrous reinforcing structure an organic diisothiocyanate and a solution of a rubber, evaporating the solvent from the resulting composite structure, associating said composite structure with a vulcanizable rubber, and subjecting the resulting mass to a vulcanizing temperature.

19. The process of manufacturing reinforced rubber articles which comprises applying to a fibrous reinforcing structure a mixed organic isocyanate-isothiocyanate compound and a solution of a rubber, evaporating the solvent from the resulting composite structure, associating said composite structure with a vulcanizable rubber, and subjecting the resulting mass to a vulcanizing temperature.

20. The process of manufacturing rubber articles reinforced with regenerated cellulose reinforcing structure which comprises applying to a regenerated cellulose reinforcing structure hexamethylene diisocyanate and a rubber solution containing from about 1% to about 20% by weight of a natural rubber, evaporating the solvent from the resulting composite structure, associating said composite structure with a vulcanizable rubber, and subjecting the resulting mass to a vulcanizing temperature.

21. Vulcanized rubber articles reinforced with a fibrous reinforcing structure, said fibrous reinforcing structure bonded to a vulcanized rubber by means of a rubber and an organic cyanate from the group consisting of polyisocyanates, polyisothiocyanates and mixed isocyanate-isothiocyanate compounds.

22. Vulcanized rubber articles reinforced with a fibrous regenerated cellulose reinforcing structure, said fibrous regenerated cellulose reinforcing structure bonded to a vulcanized rubber by means of a rubber and an organic cyanate from the group consisting of polyisocyanates, polyisothiocyanates and mixed isocyanate-isothiocyanate compounds.

23. Vulcanized rubber articles reinforced with a fibrous reinforcing structure, said fibrous reinforcing structure bonded to a vulcanized rubber by means of a plasticized rubber and an organic cyanate from the group consisting of polyisocyanates, polyisothiocyanates and mixed isocyanate-isothiocyanate compounds.

24. Vulcanized rubber articles reinforced with a fibrous reinforcing structure, said fibrous reinforcing structure bonded to a vulcanized rubber by means of a natural rubber and an organic cyanate from the group consisting of polyisocyanates, polyisothiocyanates and mixed isocyanate-isothiocyanate compounds.

25. Vulcanized rubber articles reinforced with a fibrous regenerated cellulose reinforcing structure, said fibrous regenerated cellulose reinforcing structure bonded to a vulcanized rubber by means of a natural rubber and an organic cyanate from the group consisting of polyisocyanates, polyisothiocyanates and mixed isocyanate-isothiocyanate compounds.

26. Vulcanized rubber articles reinforced with a fibrous reinforcing structure, said fibrous reinforcing structure bonded to a vulcanized rubber by means of a rubber and an organic diisocyanate.

27. Vulcanized rubber articles reinforced with a fibrous reinforcing structure, said fibrous reinforcing structure bonded to a vulcanized rubber by means of a rubber and an organic diisothiocyanate.

28. Vulcanized rubber articles reinforced with a fibrous reinforcing structure, said fibrous reinforcing structure bonded to a vulcanized rubber by means of a rubber and a mixed organic isocyanate-isothiocyanate compound.

29. Vulcanized rubber articles reinforced with a fibrous regenerated cellulose reinforcing structure, said fibrous regenerated cellulose reinforcing structure bonded to a vulcanized rubber by means of a natural rubber and hexamethylene diisocyanate.

30. The process of manufacturing rubber articles reinforced with regenerated cellulose reinforcing structure which comprises applying to a regenerated cellulose reinforcing structure 4,4'-diphenylmethane diisocyanate and a rubber solution containing from about 1% to about 20% by weight of a natural rubber, evaporating the solvent from the resulting composite structure, associating said composite structure with a vulcanizable rubber, and subjecting the resulting mass to a vulcanizing temperature.

31. Vulcanized rubber articles reinforced with a fibrous regenerated cellulose reinforcing structure, said fibrous regenerated cellulose reinforcing structure bonded to a vulcanized rubber by means of a natural rubber and 4,4'-diphenylmethane diisocyanate.

32. The process of manufacturing reinforced rubber articles which comprises applying to a cellulose reinforcing structure an aromatic diisocyanate and a solution of natural rubber, evaporating the solvent from the resulting composite structure, associating said composite structure with vulcanizable natural rubber, and subjecting the resulting mass to a vulcanizing temperature.

33. Vulcanized natural rubber articles reinforced with a cellulose reinforcing structure, said reinforcing structure bonded to vulcanized natural rubber by means of natural rubber and an aromatic diisocyanate.

ARTHUR M. NEAL.
JOHN J. VERBANC.

REFERENCES CITED

The following references are of record in the file of this patent:

UNITED STATES PATENTS

| Number | Name | Date |
|---|---|---|
| 725,094 | Kimberlin | Apr. 14, 1903 |
| 1,184,015 | Price | May 23, 1916 |
| 2,181,538 | Taylor | Nov. 28, 1939 |
| 2,263,305 | Lessig et al. | Nov. 18, 1941 |
| 1,839,950 | Cadwell et al. | Jan. 5, 1932 |
| 2,313,945 | Kellog | Mar. 16, 1943 |